Patented Oct. 12, 1954

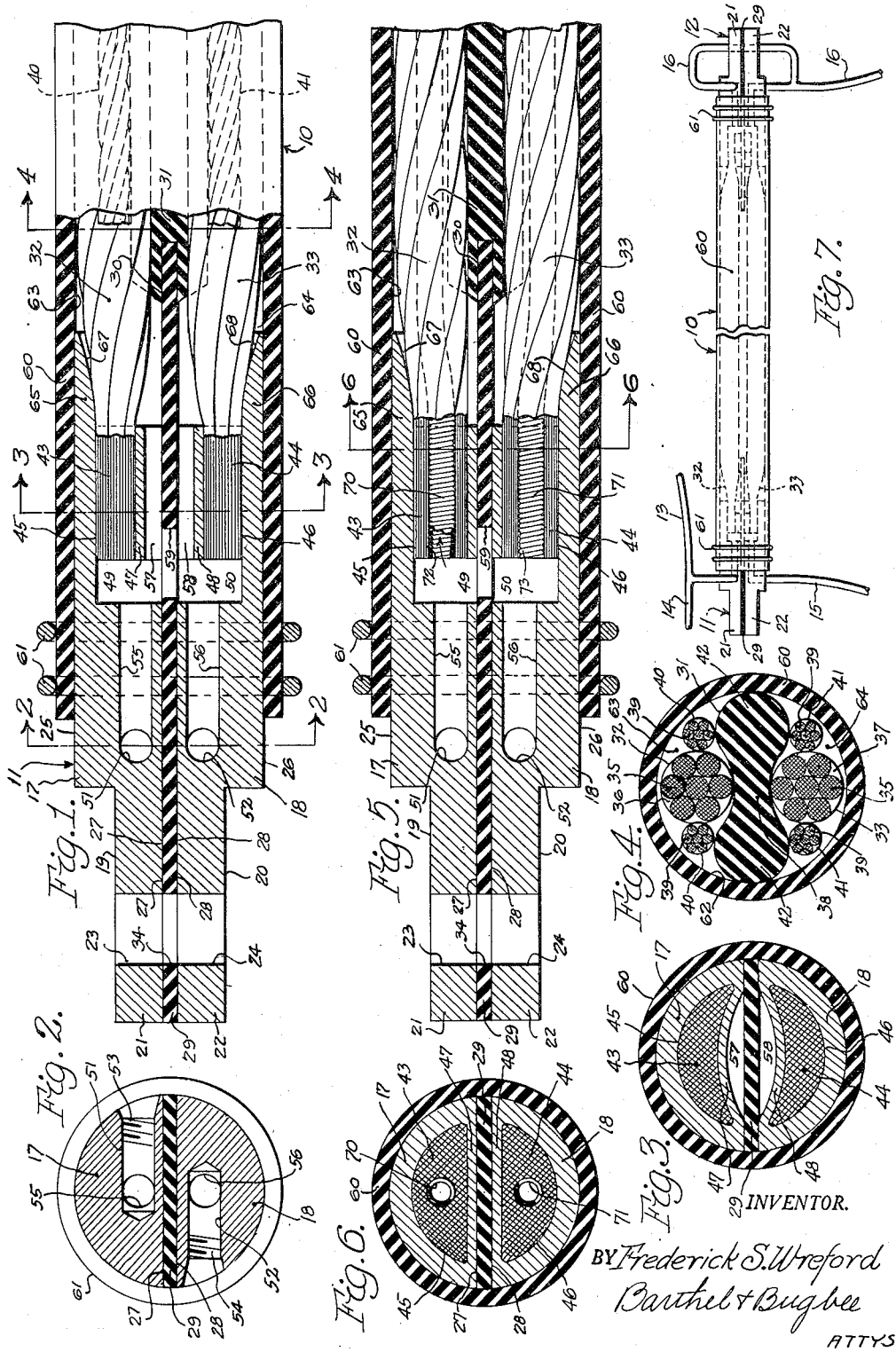

2,691,691

UNITED STATES PATENT OFFICE 2,691,691

WELDING CABLE ASSEMBLY

Frederick S. Wreford, Detroit, Mich.; Annie A. M. Wreford, executrix of the estate of Frederick S. Wreford, deceased Application February 11, 1948, Serial No. 7,597

3 Claims. (Cl. 174—15)

1

This invention relates to electric cables and in particular to welding cables.

One object of this invention is to provide a welding cable having an improved internal arrangement and insulation of the welding current conductors which permits cooling liquid to flow freely along and between the conductors and which also results in obtaining the maximum electrical efficiency from the cable.

Another object is to provide a welding cable having improved terminal heads to which the welding current conductors are connected in a manner which minimizes breakage of the wire strands during use and which firmly secures the ends of the conductors to the terminal heads.

Another object is to provide a welding cable having a flexible conduit located within the interior of the cable on each side of the insulating barrier between the conductors of opposite polarity, these conduits carrying cooling liquid and at the same time being of such construction as to permit the liquid to pass through their side walls while preventing the passage of wire splinters which would otherwise interfere with the circulation of the cooling liquid.

Another object is to provide a welding cable having improved terminal heads to which the welding current conductors are firmly connected in a manner which also provides channels for the cooling liquid to pass freely into the interior of the cable.

Another object is to provide an improved welding cable having terminal heads wherein the cooling water is arranged to flow from one side of the terminal head to the other between the ends of the conductors of opposite polarity.

In the drawings:

Figure 1 is a side elevation partly in central longitudinal section through a welding cable according to a preferred form of the present invention;

Figure 2 is a cross-section through the welding cable terminal head taken along the line 2—2 in Figure 1 and showing the cooling liquid inlet and outlet connections;

Figure 3 is a cross-section along the line 3—3 of Figure 1, showing the manner in which the conductor ends are secured to the terminals within the terminal heads;

Figure 4 is a cross-section through the welding cable along the line 4—4 in Figure 1, showing the arrangement, spacing and insulation of the conductor banks within the cable;

Figure 5 is a central longitudinal section through a modified welding cable having flexible conduits for cooling liquid arranged within the conductor banks;

Figure 6 is a cross-section along the line 6—6 in Figure 5, showing the cooling liquid conduits; and Figure 7 is a side elevation of a portion of the welding cables shown in Figures 1 to 6 inclusive illustrating the manner in which the cable is connected to the external cooling liquid conduits.

Hitherto, in welding cables made of banks of finely stranded twisted conductors, much difficulty has arisen in properly cooling the conductors and also in protecting them from breakage of the strands and consequent carrying of the strand splinters into positions where they clog the cooling action of the cooling liquid. It has also been found difficult hitherto, to properly unite the ends of the conductor banks to the terminals and at the same time properly provide for the circulation of the cooling liquid.

The present invention provides a welding cable wherein the welding conductors are formed of banks of fine wire strands and which are spaced apart from one another on opposite sides of an insulating barrier so that the cooling liquid can flow around and between the conductor banks and also from one side of the insulating barrier to the other. The breakage of the strands at the terminal heads is minimized by curving the terminals in an outwardly-flared direction at the locations where the welding conductors emerge from their points of connection to the terminals. These connections are made by forcibly pressing bridge portions within the terminal head firmly against the ends of the welding conductors while subjecting them to heat in the presence of solder, thereby also providing passageways for the cooling liquid past the ends of the welding conductors. A modification of the invention further provides flexible conduits for cooling liquid arranged within the welding conductors, these flexible conduits having walls which are freely traversed by the cooling liquid but which are impervious to the penetration of splinters of the wire strands of the cable, thereby preventing clogging of the cooling system by such strands.

Referring to the drawings in detail, Figure 1 shows a welding cable, generally designated 10, according to a preferred form of the invention, and having terminal heads or cable heads, generally designated 11 and 12 (Figure 7), at opposite ends thereof. The terminal heads 11 and 12 are of similar construction, hence a description of one will suffice for both. The terminal head 11 is connected to a cooling liquid supply line 13 from which a branch supply line 14 runs to a conventional welding gun (not shown) which is electrically connected to the cable terminal head 11, a liquid return line 15 being connected between the welding gun and the terminal head 11. The terminal head 12 at the opposite end of the cable 10 is provided with a cooling liquid discharge line 16 which interconnects the opposite sides of the terminal head 12 so as to carry away the cooling liquid which has been heated during its passage through the welding gun and welding cable 10.

The terminal head 11 (or 12) consists of a pair of terminals 17 and 18 (Figures 1 and 2) of approximately semi-circular cross-section and having flattened end portions 19 and 20 respectively providing terminal connections 21 and 22. The latter are connected to a conventional welding gun (not shown) by means of a bolt or other fastener inserted through aligned holes 23 and 24 in the flattened portions 19 and 20.

The terminals 17 and 18 within the terminal heads 11 and 12 have smooth external surfaces 25 and 26 of half cylindrical shape and are also provided with flat inner surfaces 27 and 28 which are electrically separated from one another by an insulating strip 29. The latter at its inner end is connected as at 30 to an insulating member or barrier 31 which has an elongated cross-section (Figure 4) with a relatively thin central portion and relatively thick opposite edge portions somewhat resembling an hour-glass or dumb-bell in cross-section. The insulating member 31 separates the two welding current conductors or banks 32 and 33 of opposite polarity throughout their lengths. The insulating strip 29 is bored as at 34 for the passage of the same bolt which passes through the aligned holes 23 and 24 to connect the terminal head 11 to the welding gun.

Each of the welding curent conductors 32 and 33 is formed of a very large number of fine strands of wire, usually of copper, which are twisted together into cord-like members 35 (Figure 4). These in turn are twisted together spirally to form stranded conductors 36 and 37 of relatively large diameter opposite the thin central portion 38 of the insulating member 31. Certain of the strands are twisted into smaller cord-like members 39 which are in turn twisted spirally together to form smaller stranded conductors 40 and 41 respectively located on opposite sides of their respective larger conductors 36 and 37 and likewise on opposite sides of the enlarged portions 42 of the barrier or insulating member 31.

The free ends 43 and 44 of the welding current conductors or banks 32 and 33 are mounted in recesses or openings 45 and 46 (Figures 1 and 3) of approximately crescent-shaped cross-section which are bounded on their inner sides by curved walls 47 and 48 and are preferably cast. The walls 47 and 48 are originally flat as shown in Figure 6, but are curved to their shapes shown in Figure 3 when the cable bank ends 43 and 44 are secured in the openings 45 and 46 in a manner similar to that described and claimed in my copending application Serial No. 700,891 filed October 3, 1946 for Welding Cable, which issued on April 18, 1950 under No. 2,504,777. When this is done, soft solder is placed in the pockets 49 or 50 adjacent the openings 45 or 46 and the terminal 17 or 18 is placed in a press and heated as shown in my above-mentioned Patent No. 2,504,777. Pressure is then exerted upon the wall 47 or 48 to bend it into the curved position shown in Figure 3. While this is being done, the solder melts and flows through the interstices between the strands of the fine wires. The pressure resulting from the bending of the walls 47 and 48 into their curved positions (Figure 3) forces the strands of the welding conductors 32 and 33 together into compact masses. The solder is of course used in connection with a flux, such as rosin, which dissolves the oxide from the wires and the pressure, exerted by any suitable plunger, sinters the wires together in copper-to-copper union. When the solder seeps through the opposite end of the conductor 32 or 33 adjacent the inner ends of the walls 47 or 48, this indicates that a sufficient amount of solder has been applied. The solder also subsequently prevents corrosion at these locations. A pressure in the neighborhood of twenty tons is preferably employed for this purpose. Cooling liquid is preferably applied to the conductors 32 and 33 while this is being done in order to prevent them from heating up to their annealing temperatures.

In order to cool the terminal heads 11 and 12 and the conductors 32 and 33 within the cable 10, and also to cool the welding gun attached thereto, the terminals 17 and 18 are provided with transverse passageways 51 and 52 (Figures 1 and 2) which extend in opposite directions and are threaded as at 53 and 54 for connection to the cooling liquid lines 13, 15 or 16 (Figure 7). The inner ends of the transverse passageways 51 and 52 are connected to the ends of longitudinal liquid passageways 55 and 56 leading to the pockets 49 and 50 respectively. The curving of the walls 47 and 48 (Figures 1 and 3) results in the provision of liquid passageways 57 and 58 leading from the pockets 49 and 50 into the interior of the cable 10. The insulating strip 34 is provided with a hole 59 (Figure 1) interconnecting the pockets 49 and 50 so that cooling liquid may pass freely therebetween.

The cable 10 is encased in a tubular sheath or casing 60 of insulating material, such as rubber or synthetic rubber, and this is clamped to the cable terminal heads 11 or 12 in any suitable manner, such as by the clamping rings 61 (Figure 1). The insulating member or barrier 31 divides the interior of the cable 10 into two chambers 63 and 64 containing the welding conductors 32 and 33 respectively. The insulating barrier 31 has a very loose fit within the sheath 60 (Figure 4) so that liquid may pass between the inner wall 62 of the sheath 60 and the adjacent outer edge portions 42 of the barrier 31 from the chamber 63 to the chamber 64 and vice versa.

The inner end portions 65 and 66 of the terminals 17 and 18 (Figure 1) are flared outwardly as at 67 and 68 respectively in curved surfaces, preferably of hyperbolic longitudinal section. This construction minimizes the breakage of the strands of the conductors 32 and 33 which ordinarily occurs adjacent the terminal heads of welding cables, by eliminating sharp edges which might serve as fulcrums, and insuring that the portions thereof adjacent the flared surfaces 67 and 68 bend gradually and evenly as the cable 10 itself is bent during handling.

The appearance of the cables 36, 37, 39 and 41 in Figure 4 is purposely exaggerated to show the manner in which the sets of three cables each are united to form the welding conductors 32 and 33 respectively. In actual practice, these cables are larger in diameter and are not spaced apart from one another to the extent shown in Figure 4, but fill the chambers 63 and 64 more fully than Figure 4 shows. There is still sufficient space, however, for the cooling liquid to travel through the cable.

In the operation of the invention, assuming that a conventional welding gun has been connected to the terminal head 11, the cooling liquid supply line 13 (Figure 7) is connected to a source of cooling water or other cooling liquid, the current is turned on and welding operations are conducted in the usual manner. The cooling liquid passes from the liquid supply line 13 through the passageways 51 and 55 of the terminal head 11 into the pocket 49, thence through the pasasgeway 57 into the chamber 63 surrounding and containing the conductor 32. At the same time, a portion of the cooling liquid passes through the hole 59 to the opposite side of the terminal head and continues through the passageway 58 into the chamber 64 surrounding and containing the conductor 33. The liquid passes lengthwise through the chambers 63 and 64 to the opposite end of the cable where it enters the terminal head 12. As previously stated, the latter is of similar construction to the terminal head 11.

The flow of the electric welding current through the conductors 32 and 33 heats up the individual strands of fine wire of which these are composed, and since the welding current is ordinarily 60 cycle alternating current, the fluctuation thereof causes the wire strands to move apart and together alternately in rapid succession. This action moves the cooling water in and out through the interstices between the strands, carrying away the heat and preventing damage to the cable 10. At the same time, the heated cooling liquid returning from the welding gun through the conduit 15 passes through the passageways 54 and 56 into the pocket 50, thence through the passageway 58 into the chamber 64 within the cable sheath 60, and accompanies the other cooling liquid in its course lengthwise through the cable 10. Some of the cooling liquid flows past the edge portions 42 of the insulating member or barrier 31 between the chambers 63 and 64. The heated cooling liquid passes outward through the passageways 55, 56 to the terminal head 12 into the cooling liquid discharge line 16. The cooling liquid ordinarily employed is ordinary tap water which, on account of its low electrical conductivity, prevents short-circuiting of the welding conductors, which are carrying the welding current of low voltage but high amperage.

The modification shown in Figures 5 and 6 is generally similar in construction and operation to the principal form of the invention shown in Figures 1 to 4 inclusive and is similarly connected as in Figure 7. Similar parts of Figures 5 and 6 are therefore similarly designated to the corresponding parts in Figures 1 to 4 inclusive. Positive cooling of the conductors 32 and 33 in Figures 5 and 6, however, is insured by means of flexible conduits 70 and 71 respectively arranged within the conductors 32 and 33, the conductors being wound around their respective conduits during manufacture. The flexible conduits 70 and 71 are preferably formed of spirally wound stock, so that their side walls are permeable to liquid which can push its way out through the spiral interstices between the spirally wound wires 72 and 73 making up the side walls of the conduits 70 and 71. At the same time, however, these interstices are so narrow in width that they effectively bar the entry of any splinters of wire strands which may be broken off from the individual wires of which the conductors 32 and 33 are made up. In this manner, the splinters are prevented from clogging the cooling lines, and the flexibility of the conduits 70 and 71 enables the cable 10 to be bent freely without interfering with the flow of the cooling liquid.

In actual practice, the cables 36, 37, 39 and 41 will not be of circular cross-section as shown in Figure 4, after they have been assembled. After assembly, these cables will flatten out and their strands will almost completely fill the space within the cable sheath 60. The strands, however, leave sufficient spaces for the passage of the cooling water between them.

In actual practice, also, the entire internal assembly is twisted bodily, including the insulating member or barrier 31. This is done in a machine which twists the internal assembly while assembling the conductors alongside the insulating member 31. The twisting may take place at any desired interval, a complete turn every 9 inches being found satisfactory. This twisting imparts flexibility to the cable which it would not otherwise easily possess, due to the resistance of the insulating member 31 to twisting in the direction of its edges. The cable 10 of the present invention is also especially well adapted to the use of a binder strap in place of the clamping rings 61, because the surfaces 25 and 26 are on relatively thick and strong portions of the terminals where they serve as anvils for sustaining heavy pressure. For this reason, the clamping rings 61 or bands may be clamped more tightly than in prior welding cables because such prior cables were structurally weak at the locations where the clamping rings were attached. Certain of these prior cables, for example, attached the cable sheaths to a short section of structurally weak brass tubing. The present construction enables a stronger connection to be made and also prevents leakage of the cooling water at such connections.

What I claim is:

1. A flexible cable unit for welding equipment comprising a tubular insulating casing, a plurality of flexible welding current conductors within said casing, a transversely-extending insulating member arranged lengthwise between said conductors, and terminal heads connected to the opposite ends of said conductors, at least one of said terminal heads having a plurality of elongated terminals therein arranged side by side lengthwise of said conductors and an elongated longitudinal insulating element disposed between said terminals, said terminals having longitudinal recesses therein with inner walls extending adjacent said insulating member and the ends of said conductors being secured within said recesses, said terminals having arcuately-curved bridge portions extending across the inner sides of said recesses and forming said inner walls of said recesses, said bridge portions being bent outwardly into tight engagement with said conductor ends.

2. A flexible cable unit for welding equipment comprising a tubular insulating casing, a plurality of flexible welding current conductors within said casing, a transversely-extending insulating member arranged lengthwise between said conductors, and terminal heads connected to the opposite ends of said conductors, at least one of said terminal heads having a plurality of elongated terminals therein arranged side by side lengthwise of said conductors and an elongated longitudinal insulating element disposed between said terminals, said terminals having longitudinal recesses therein with inner walls extending adjacent said insulating member and the ends of said conductors being secured within said recesses, said terminals having a cooling liquid passageway therein opening into said recesses, said terminals also having arcuately-curved bridge portions extending across the inner sides of said recesses and forming said inner walls of said recesses and providing additional cooling liquid passageways from said recesses into the interior of said casing.

3. A terminal head for welding cables comprising a plurality of longitudinally-elongated terminals arranged side by side and having cooling liquid bores therein, and a longitudinally-elongated insulating member with substantially flat opposite surfaces disposed between said terminals, each of said terminals being approximately semi-cylindrical at at least one end thereof, said terminals having approximately semi-cylindrical recesses in the semi-cylindrical ends thereof with arcuately-curved bridge portions extending across said recesses, said bridge portions lying adjacent said insulating member and forming inner side walls of said recesses, said arcuately-curved bridge portions and said flat surfaces of said insulating member defining cooling liquid passageways therebetween communicating with said bores.

References Cited in the file of this patent
UNITED STATES PATENTS

| Number | Name | Date |
|---|---|---|
| 1,173,400 | Willson | Feb. 29, 1916 |
| 1,937,431 | Mendel | Nov. 28, 1933 |
| 2,175,251 | Carson | Oct. 10, 1939 |
| 2,175,749 | Eckman | Oct. 10, 1939 |
| 2,234,435 | Johnson | Mar. 11, 1941 |
| 2,302,839 | Burgett | Nov. 24, 1942 |
| 2,308,673 | Burgett | Jan. 19, 1943 |
| 2,427,518 | Bergan | Sept. 16, 1947 |
| 2,440,668 | Tarbox | Apr. 27, 1948 |
| 2,480,803 | Wreford | Aug. 30, 1949 |
| 2,483,301 | Roberds | Sept. 27, 1949 |
| 2,504,777 | Wreford | Apr. 18, 1950 |
| 2,586,471 | Matthysse | Feb. 19, 1952 |